Dec. 27, 1966 W. SCHIEBELER 3,294,908

RECEIVING SYSTEM FOR AN ELECTRONIC TELEPRINTER

Filed April 3, 1963 3 Sheets-Sheet 1

INVENTOR

WERNER SCHIEBELER

BY Percy P. Lantzy

ATTORNEY

Transistor blocked = 0
Transistor unblocked = 1 l = Left r = Right

| Number | Flip - Flop | | | | | | | |
|---|---|---|---|---|---|---|---|---|
| | 6a | | 6b | | 6c | | | Scanning for Signal Pulse |
| Decadic | l | r | l | r | l | r | Step | |
| 0 | 1 | 0 | 1 | 0 | 1 | 0 | is being skipped | |
| 1 | 0 | 1 | 1 | 0 | 1 | 0 | Stop Element | |
| 2 | 1 | 0 | 0 | 1 | 1 | 0 | Start | 1 |
| 3 | 0 | 1 | 0 | 1 | 1 | 0 | 1 | 2 |
| 4 | 1 | 0 | 1 | 0 | 0 | 1 | 2 | 3 |
| 5 | 0 | 1 | 1 | 0 | 0 | 1 | 3 | 4 |
| 6 | 1 | 0 | 0 | 1 | 0 | 1 | 4 | 5 |
| 7 | 0 | 1 | 0 | 1 | 0 | 1 | 5 | |

Fig. 2

INVENTOR
WERNER SCHIEBELER

BY Percy P. Lantzy
ATTORNEY

INVENTOR
WERNER SCHIEBELER

BY Percy P. Lantzy
ATTORNEY

United States Patent Office 3,294,908
Patented Dec. 27, 1966

3,294,908
RECEIVING SYSTEM FOR AN ELECTRONIC TELEPRINTER

Werner Schiebeler, Eutingen, Pforzheim, Germany, assignor to International Standard Electric Corporation, New York, N.Y., a corporation of Delaware
Filed Apr. 3, 1963, Ser. No. 270,407
Claims priority, application Germany, Apr. 7, 1962, St 19,061
2 Claims. (Cl. 178—88)

The present invention relates to a receiving system for an electronic teleprinter as is required for the reception of a series of teleprinter pulses arriving over a telegraph line. In contrast to the conventional types of mechanical teleprinters in which the series-to-parallel conversion of the telegraph signals is effected with the aid of mechanical elements, an electronically operating teleprinter should contain as few as possible moving parts which necessarily require more maintenance and are subjected to a greater wear.

In trying to obtain a useful electronic receiving system there are a great number of solutions suggesting the employment of conventional components, such as flip-flops, multivibrators, frequency dividers, storages, conversion gates, etc. The principal item of the series-to-parallel converters of all conventional systems which, by way of example, are known from the German printed applications (DAS) 1,091,151, 1,053,026, and 1,098,535, is the shift register which mainly comprises flip-flop stages or toroidal cores.

The present invention, however, provides an electronic receiving system for teleprinters avoiding the use of a shift register, in order to obtain a certain simplification with respect to the clock-pulse transmission for the series-to-parallel converter, and in view of the evaluation. The inventive type of receiving system consists of a multivibrator and of a frequency divider serving as the time base which are stopped and released to perform the oscillations with the aid of the start and stop elements arriving over the line. The systems is further composed of a binary counter distributing the signal pulses of the teleprinter combination to coincidence circuits, and of storage flip-flops controlled by both the coincidence circuits and the incoming signals. This inventive type of receiving system is characterised by the fact that the coincidence circuits, at a time interval (scanning time position) which is adjustable in relation to the start element of the incoming signals, are successively caused to transmit positive pulses erasing their associated storage flip-flop, by the action of the binary counter, and that the negative pulse produced at the trailing edge of such a pulse, quite depending on the potential existing on the receiving line, either serves to mark the respective storage, or is directed towards ground via a diode.

In this invention a potentiometer is used for setting the scanning time position of the signals which, in connection with a capacitor, forms an RC-circuit lying parallel in relation to the incoming line for the purpose of delaying the start of the oscillation of the multivibrator and of the frequency divider with respect to the starting element arriving over the line, up to the maximum of one signal element.

Figure 1:
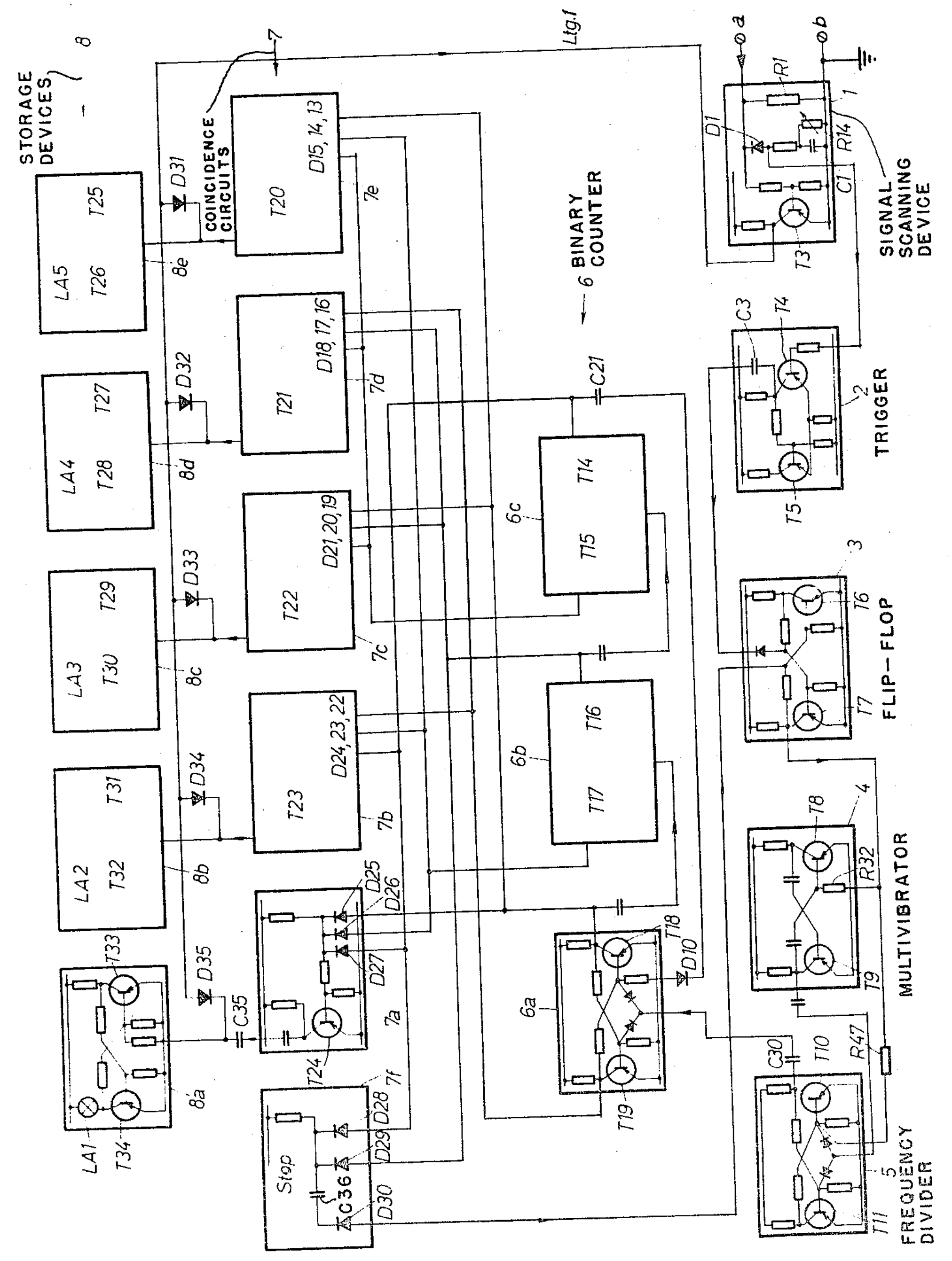
Figure 3:
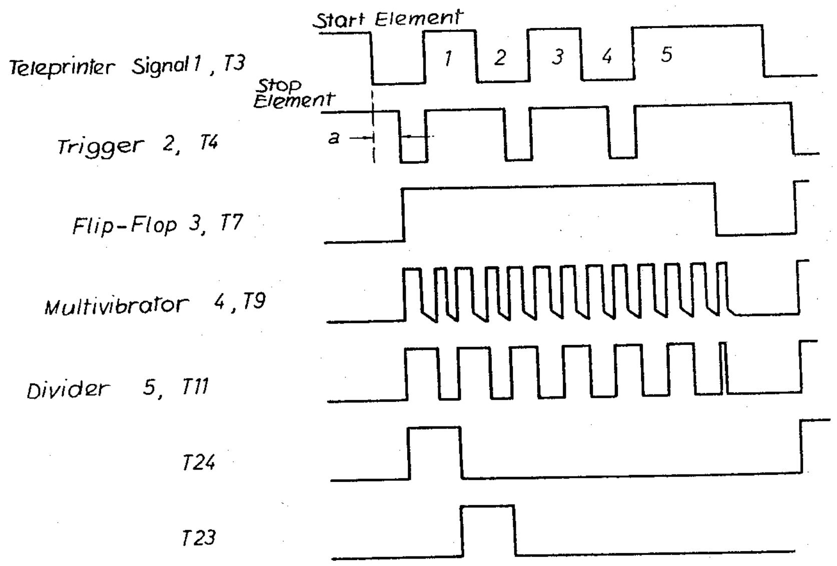

The invention will now be explained in detail with reference to FIGS. 1–3 of the accompanying drawings, in which:

FIG. 1 shows the basic circuit diagram of the inventive type of receiving system, FIG. 2 shows the stepping scheme of the employed binary counter, and FIG. 3 shows a pulse diagram of the individual stages of the receiving system.

The incoming signals are fed to the signal-scanning device 1 and also the pulses delivered by the coincidence circuits 7 via the diodes D31 . . . D35 and the line L*tg*1. The signal-scanning device 1 then, via a trigger 2 and a flip-flop 3, determines the time position when multivibrator 4, acting as a master clock, and frequency divider 5 start to oscillate. The pulses as produced by the master clock are applied to a binary counter 6 consisting of the three flip-flop stages *6a* . . . *6c* comprising the transistors T14 . . . T18. The pulses allocated to the individual signal elements in succession cause the coincidence circuits 7 successively to transmit pulses which, the stop pulse in circuit *7f*, and quite depending on the line condition, serve to mark the storage flip-flops 8 consisting of two transistors T25, T26 . . . T33, T34.

The mode of operation of the receiving system will now be explained in detail: with no teleprinter signal being received via the telegraph line, a line current of 40 milliamperes is flowing via the line *a, b* into the base electrode of the transistor T3, and both transistors T3 and T4 are unblocked. The multivibrator 4 consisting of the transistors T8 and T9, and the frequency divider 5 consisting of the transistors T10 and T11, are prevented from oscillating by the flip-flop 3 because the transistor T7 is blocked, and the transistors T8 and T10 are kept in the unblocked state via the resistors R32 and R47. The binary counter is now in the position corresponding to the decadic number 1 since, as will be explained hereinafter, its zero position is suppressed by the action of additional switching means. This position "1" corresponds to the stop element.

Upon reception of a telegraph signal, for example at a telegraph speed of 50 bauds, there is effected first an interruption of the line current for the duration of 20 ms. during the start element, and the transistor T3 is immediately blocked. The transistor T4 which is connected together with the transistor T5 to form the trigger 2, however, only becomes blocked after a time-delay period *a*, the duration of which is determined by the discharge of the capacitor C1 via the resistor R14. R14 is designed as a potentiometer and may be set or adjusted from the outside. With the aid of this potentiometer it is possible to change the time-delay period *a* for the reversal of the trigger 2 from 0 to about 20 ms. (in the case of a telegraph speed of 50 bauds). As will be explained hereinafter in detail, it is possible with the aid of this adjustment to determine the scanning time position of the teleprinter pulses. In the pulse diagram as shown in FIG. 3, a time delay of 10 ms. has been assumed to correspond to a centre scanning of the teleprinter pulses. Accordingly, transistor T4 is blocked 10 ms. after the start-stop edge, and transmits a negative pulse to base of the transistor T7 of flip-flop 4 via capacitor C3. This unblocks transistor T7 and causes both the multivibrator 4 and the frequency divider 5 to start to oscillate and transmit positive stepping pulses to the binary counter 6 via the capacitor C30. The binary counter 6 is stepped-on in the course of seven steps to its normal position in accordance with the stepping scheme as shown in FIG. 2. The step-interval which is determined by the duration of the periods of the divider 5, is 20 ms. in the case of a telegraph speed of 50 bauds, and the multivibrator 4 oscillates at a frequency of 100 c./s.

In distinction to the transmitting equipment of a teleprinter, the stop element in the receiving equipment of a teleprinter may only be regarded as a single element, so the binary counter must be returned to its normal position in seven instead of eight steps. The skipping of the necessary one step is effected by the connection of the collector of transistor T14 to the base electrode of transistor T18 via the capacitor C21.

Negative pulses are each time applied to the individual coincidence circuits *7a* to 7*e* via the three diodes D13, D14, D15 . . . D25, D26, D27, and the lines which are each associated with respective collectors of the transistors T14 . . . T19. The respective one of the associated transistors T20 to T24 is unblocked if, and as long as, a pulse is simultaneously applied each time to all three of the diodes to the base electrode of the respective transistor, so that the latter is unblocked during the time duration of a pulse. The collectors of the transistors T14 to T19 of the binary counter are thus connected to the diodes of the coincidence circuits in such a way that the coincidence circuits successively unblock the transistors T24, 23, 22, 21, 20 in the rhythm of the incoming signals, as may be easily taken from the stepping scheme as shown in FIG. 3, and from the pulse diagram as shown in FIG. 2. For example, if transistor T24 of the received start element is opened, then it will transmit a positive pulse, via the capacitor C35, to the base electrode of the transistor T33 of the first storage flip-flop 8*a*. Due to this positive pulse, the storage flip-flop is brought into its normal position, provided that it was not already in this position, so that its lamp LA1 will be lit. Any other information which was previously stored in the storage device, will be erased in this way. One step later, in the middle of the first signal element, the transistor T24 is blocked again, and will transmit a negative pulse via the capacitor C35. What happens in the storage depends on whether the first signal element is a curent pulse or a no-current pulse. If the element is a current pulse, then transistor T3 is unblocked. The negative pulse as produced by the transistor T24 is conducted by diode D35 and the unblocked transistor T3, towards ground. This does not change the position of the storage flip-flop 8*a*, and the lamp LA1 remains lit.

This is different, in cases where the first signal element is a no-current pulse. In this particular case the transistor T3 is blocked. The negative pulse of the transistor T24 is no longer transferred via the diode D35 and the transistor T3, but is applied to the base electrode of the transistor T33 for unblocking the latter. The first storage flip-flop 8*a* is reversed, and the lamp LA1 is extinguished. In an analogous way the four further signal elements are scanned and will then either cause the lighting-up or the extinguishing of the further lamps LA2 . . . LA5.

As soon as the binary counter has completed one passage, a negative voltage is produced at the coincidence circuit 7*f* comprising the diodes D28, D29, with respect to the stop, which leads to a negative pulse behind the capacitor C36. This pulse is applied, via the diode D30, to the base electrode of the transistor T6, so that the flip-flop 3 is triggered. This causes the blocking of the transistor T7 which, via the resistors R32 and R47, interrupts the oscillations of the multivibrator 4 and of the frequency divider 5. The receiving system has completed one passage, has performed the parallel storing-in of a serially received teleprinter signal within five storage flip-flops, and is now at rest, ready to receive a new teleprinter signal.

The teleprinter pulses which are stored in the five storage flip-flops 8*a* . . . 8*e*, and which are undisturbedly available during the stop and start elements, may now be used further at will.

The information as stored in the storage device may be read off the five lamps LA1 . . . LA5. From the flashing of the lamps it is possible during the operation, to also extensively recognize any faulty functioning of the apparatus.

For example, five transistor-output stages may be connected to the storage devices, which either serve to actuate the setting magnets of a mechanical page printer, or the magnets operating the punching needles of a perforator. In addition thereto, it is still possible to connect to the coincidence circuit of the stop element, an output stage which may either be adapted to initiate the printing process of a page printer, or the perforating process.

In order to make the receiving system extensively independent of the amount of line current, there are provided two (not shown) input transistors, which are strongly overbiased (overdriven).

The time position of scanning the signal pulses may be displaced at will just like in the case of a mechanical teleprinter, with the aid of the potentiometer R14, because by varying R14, there is changed the time delay *a* as shown in FIG. 3 and, consequently, the starting of the oscillation as produced by the multivibrator.

The present receiving system can be easily adapted to various telegraph speeds. This requires a switchover of the multivibrator frequency.

Since the multivibrator, when starting to oscillate, does not quite have constant lengths of period, and since only the sum of two lengths of periods is approximately constant, as may be taken from FIG. 3, the multivibrator is followed by the frequency divider 5 which, in turn, serves the stepping-on of the binary counter. Instead of a multivibrator it is also possible to use as a master clock or pulse generator, a higher frequency quartz oscillator with a number of, e.g. 9 or more, subsequently arranged flip-flop circuits for serving as frequency dividers. During the stop element, of course, not the quartz oscillator itself, but only the subsequently arranged dividers are stopped from oscillating in the same way, and are tilted into the normal position, as has been described hereinbefore with respect to the divider 5 (via R47), with reference to FIG. 1.

While I have described above the principles of my invention in connection with specific apparatus, it is to be clearly understod that this description is made only by way of example and not as a limitation to the scope of my invention as set forth in the objects thereof and in the accompanying claims.

What is claimed is:

1. A receiving system for electronic teleprinters comprising:

a signal scanning device for receiving incoming signals;

means connecting said scanning device to a multivibrator and a frequency divider, such that the incoming start and stop elements of the incoming signals respectively cause the start and stopping of oscillations produced by said multivibrator and frequency divider;

a binary counter connected to said frequency divider for distributing the teleprinter signal combinations to a plurality of coincidence circuits;

a storage flip-flop connected to each of said coincidence circuits and controlled by both the coincidence circuits and the incoming signals; and means in said signal scanning device for adjusting the scanning time position in relation to the start element of the incoming signals, whereby said coincidence circuit are successively caused to transmit positive pulses erasing their associated storage flip-flop by the action of the binary counter, and the negative pulse produced at the trailing edge of said positive pulse, depending on the potential of the incoming signals, serves in one case to mark the respective storage and in another case is directed to ground by a diode.

2. A receiving system according to claim 1 wherein said means for adjusting the scanning time position is a potentiometer in combination with a capacitor, forming an R.C.-circuit lying parallel in relation to the incoming line, said R.C.-circuit being capable of delaying the start of the oscillation of the multivibrator and of the frequency divider with respect to the start element arriving over the line, from the time position zero to the time position corresponding to the maximum of one length of the start element.

References Cited by the Examiner

UNITED STATES PATENTS

| | | | |
|---|---|---|---|
| 2,635,229 | 4/1953 | Gloess et al. | 340—167 |
| 3,005,871 | 10/1961 | Rudolph | 178—26.5 |

NEIL C. READ, *Primary Examiner.*

T. A. ROBINSON, *Assistant Examiner.*